United States Patent
Pelster et al.

(10) Patent No.: US 9,483,185 B2
(45) Date of Patent: Nov. 1, 2016

(54) GRADUAL CONTEXT SAVING IN A DATA STORAGE DEVICE

(71) Applicant: Intel Corporation, Santa Clara, CA (US)

(72) Inventors: David J. Pelster, Longmont, CO (US); Xin Guo, San Jose, CA (US); David M. Jones, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/572,581

(22) Filed: Dec. 16, 2014

(65) Prior Publication Data

US 2016/0170641 A1   Jun. 16, 2016

(51) Int. Cl.
  *G06F 12/02*   (2006.01)
  *G06F 3/06*   (2006.01)
(52) U.S. Cl.
  CPC ............. *G06F 3/061* (2013.01); *G06F 3/0655* (2013.01); *G06F 3/0688* (2013.01)
(58) Field of Classification Search
  CPC ..... G06F 3/061; G06F 3/0688; G06F 3/0655
  See application file for complete search history.

(56) References Cited

U.S. PATENT DOCUMENTS

| | | | | |
|---|---|---|---|---|
| 9,003,131 B1 * | 4/2015 | Lunev | ................... | G06F 3/0668 711/147 |
| 2008/0127201 A1 * | 5/2008 | Mori | ....................... | G06F 9/461 718/108 |
| 2010/0125722 A1 * | 5/2010 | Hickey | ................. | G06F 9/3851 712/228 |
| 2011/0082959 A1 * | 4/2011 | Ageishi | .................... | G06F 13/24 710/263 |
| 2011/0271088 A1 * | 11/2011 | Princen | ............... | G06F 9/45533 713/2 |
| 2012/0023311 A1 * | 1/2012 | Yamamoto | ............ | G06F 9/3851 712/205 |
| 2012/0078951 A1 * | 3/2012 | Hsu | ................... | G06F 17/30455 707/769 |
| 2013/0080717 A1 * | 3/2013 | Uehara | ............... | G06F 12/0246 711/154 |
| 2014/0189198 A1 * | 7/2014 | Siddiqi | ............... | G06F 12/0246 711/103 |

* cited by examiner

*Primary Examiner* — Hiep Nguyen
(74) *Attorney, Agent, or Firm* — Grossman, Tucker, Perreault & Pfleger, PLLC (57) ABSTRACT

The present disclosure is directed to gradual context saving in a data storage device. An example data storage device may comprise at least a non-volatile memory and a control module. The control module may cause context data to be gradually saved to the non-volatile memory based on monitoring write activity to the nonvolatile memory, wherein the context data may correspond to a current state of the data storage device. The control module may cause context data to be saved based on a budget ratio. For example, a budget ratio may compare an amount of total budget consumed (e.g., based a capacity of the data storage device, an amount of data stored in the data storage device, a target time-to-ready for the data storage device, etc.) to an amount of total context data that has already been written to the non-volatile memory.

22 Claims, 4 Drawing Sheets

GRADUAL CONTEXT SAVING IN A DATA STORAGE DEVICE

TECHNICAL FIELD

The present disclosure relates to data storage device operation, and more particularly, to saving context data in a data storage device while minimizing negative impacts on performance of the data storage device.

BACKGROUND

Until recently, computing devices typically employed electromechanical storage devices (e.g. hard drives) for nonvolatile (NV) data storage (e.g., operating system, applications, data, etc.). The limitations of electromechanical hard drives wherein magnetic platters are spun by a motor and read by a moving head are readily apparent. Electromechanical hard drives are prone to mechanical fatigue, damage from jostling, drops, etc., include electromechanical motors and actuators that consume substantial amounts of power, etc. These limitations have led to the development of solid state drive (SSD) technology wherein data is stored in NV memory (e.g., NAND Flash memory) instead of magnetic media. SSDs are fully electronic, and thus, have no moving parts. SSDs have many benefits over electromechanical hard drives due, at least in part, to a lack of any moving parts. A lack of moving parts means that data can be written and read from SSDs faster than electromechanical hard drives. However, these apparent benefits do not come without some challenges that are different from electromechanical hard drives. For example, the SSD lifetime may be based on an amount of write activity to the NV memory in the SSD. Memory locations in NV memory in the SSD may experience a certain amount of write cycles (e.g., about 3000 to 5000 write cycles) before becoming unreliable. This can be problematic for certain types of data that is written to NV memory repeatedly. To avoid this problem, wear-leveling may be performed to move data within the NV memory in the SSD so that a particular memory location does not experience an inordinate amount of activity.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Wear-leveling and other optimizations in an SSD (e.g., for reliability, speed, etc.) may be kept transparent to the operating system (OS) through the use of mapping tables that may map a constant logical address to the physical location of data in the NV memory in the SSD. For example, as the physical location of data moves, the logical address may be updated to point to the new physical location. Keeping track of this mapping and other state-related information in the SSD may be important to ensure that the SSD performs acceptably in view of user expectations. For example, while an SSD may be able to reconstruct this state-related information at power up (e.g., after an orderly shutdown or disorderly shutdown due to a system error, power outage, etc.), a user may not want to, or may not have the time to, wait for reconstruction of the context of the SSD to be complete.

The present disclosure is directed to gradual context saving in a data storage device. An example device may comprise a data storage device (e.g., SSD) and a control module for the data storage device. The control module may cause the data storage device to gradually save context data based on monitoring write activity in the data storage device, wherein the context data may correspond to a current state of the data storage device. In at least one embodiment, the control module may cause context data to be saved based on a budget ratio. For example, a budget ratio may compare an amount of budget consumed out of a total budget to an amount of context data written out of a total amount of context data to write. The total budget may be based on, for example, the size of the data storage device, the amount of data in the data storage device, a target time-to-ready for the data storage device, etc. After write activity occurs, the control module may evaluate the context data already written to the data storage device in view of the budget ratio, and may gradually save additional context data to the data storage device based on the budget ratio. In the same or a different embodiment, a context threshold may cause the budget ratio to be reset. The context threshold may be reached when the saved context data is determined to reflect the current state of the data storage device in entirety.

In at least one embodiment, a device configured for gradual context saving in a data storage device may comprise, for example, a data storage device and a control module for the data storage device. The control module may be to at least monitor write activity to nonvolatile memory in the data storage device and to save context data to the nonvolatile memory gradually utilizing a ratio based on an amount of write activity monitored, the context data corresponding to a current state of the data storage device.

In at least one embodiment, the control module may be located in the data storage device. Alternatively, the control module may be part of a processing module coupled to at least the data storage device via at least one bus in the device. In at least one embodiment, the write activity may occur in increments and the control module is to determine whether to save the context data to the non-volatile memory utilizing the ratio after each increment of write activity. The ratio may be to compare an amount of total budget consumed to an amount of total context data that has already been written to the non-volatile memory. The control module may then be to determine the total budget based on at least one of a capacity of the data storage device, an amount of data stored in the data storage device or a target time-to-ready for the data storage device.

In at least one embodiment, the control module may be to determine if a context threshold has been reached and to reset the ratio based on a determination that the context threshold has been reached. In determining that the context threshold has been reached the control module may be to determine that the saved context data corresponds to the current state of the data storage device in entirety. In at least one embodiment, the data storage device may be a solid state drive (SSD). Consistent with the present disclosure, a data storage device may comprise a control module to at least monitor write activity to nonvolatile memory in the data storage device and to save context data to the nonvolatile memory gradually utilizing a ratio based on an amount of write activity monitored, the context data corresponding to a current state of the data storage device. Consistent with the present disclosure, a method for gradual context saving in a data storage device may comprise monitoring write activity to a nonvolatile memory in a data storage device and saving context data to the non-volatile memory gradually utilizing a ratio based on an amount of write activity monitored, the context data corresponding to a current state of the data storage device.

Figure 1:
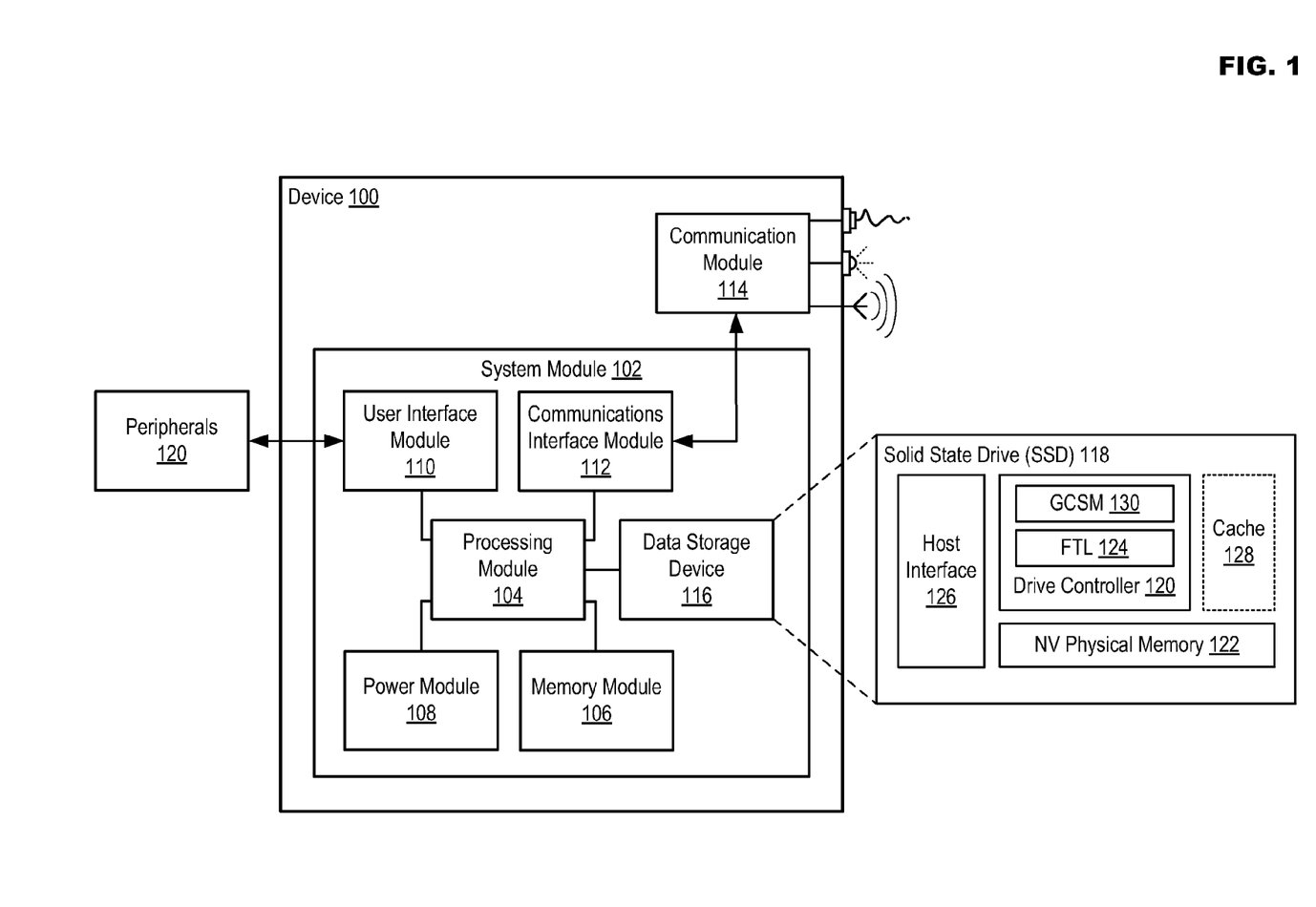
FIG. 1 illustrates an example device configured for gradual context saving in a data storage devices in accordance with at least one embodiment of the present disclosure.

FIG. 1 illustrates example device 100 configured for gradual context saving for a data storage device in accordance with at least one embodiment of the present disclosure. Examples are presented herein for explaining various embodiments consistent with the present disclosure. Some of these examples may characterize a data storage device as an SSD. These examples are merely for the sake of explanation, and are not meant to limit the various embodiments to being implemented only in SSDs. On the contrary, the various embodiments presented herein may be implemented with any technology, format, make, type, size, speed, etc. of data storage device existing now or in the future.

Device 100 is presented herein as an example platform on which embodiments consistent with the present disclosure may be implemented. Device 100 may be, for example, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Regardless, device 100 is presented only for the sake of explanation, and is not meant to limit the various embodiments to any particular manner of implementation.

Device 100 is illustrated in FIG. 1 as comprising at least elements 102 to 116. Elements 102 to 116 are presented herein merely for the sake of explanation. Any of elements 102 to 116 may be altered, omitted, etc. consistent with the present disclosure. System module 102 may be configured to manage operations in device 100 and may include processing module 104, memory module 106, power module 108, user interface module 110, communication interface module 112 and at least one data storage device 116. Device 100 may also include communication module 114. While communication module 114 has been shown as separate from system module 102, the example implementation disclosed in FIG. 1 has been provided merely for the sake of explanation. Some or all of the functionality associated with communication module 114 may be incorporated into system module 102.

In device 100, processing module 104 may comprise one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing module 104 may interact with other system components that may be operating at different speeds, on different buses, etc. in device 100. Some or all of the functionality commonly associated with the support circuitry may also be included in the same physical package as the processor (e.g., such as in the Sandy Bridge family of processors available from the Intel Corporation).

Processing module 104 may be configured to execute various instructions in device 100. Instructions may include program code configured to cause processing module 104 to perform activities related to reading data, writing data, processing data, formulating data, converting data, transforming data, etc. Information (e.g., instructions, data, etc.) may be stored in memory module 106. Memory module 106 may comprise random access memory (RAM) or read-only memory (ROM) in a fixed or removable format. RAM may include volatile memory configured to hold information during the operation of device 100 such as, for example, static RAM (SRAM) or Dynamic RAM (DRAM). ROM may include non-volatile (NV) memory modules configured based on BIOS, UEFI, etc. to provide instructions when device 100 is activated, programmable memories such as electronic programmable ROMs (EPROMS), Flash, etc.

Power module 108 may include internal power sources (e.g., a battery, fuel cell, etc.) and/or external power sources (e.g., electromechanical or solar generator, power grid, external fuel cell, etc.), and related circuitry configured to supply device 100 with the power needed to operate. User interface module 110 may include hardware and/or software to allow users to interact with device 100 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 110 may be incorporated within device 100 and/or may be coupled to device 100 via a wired or wireless communication medium. For example, peripherals 120 may comprise external user interface devices coupled to device 100 via at least one wired and/or wireless interface. Peripherals 120 may include, for example, a monitor, a keyboard, a pointing device (e.g., a mouse), a printing device, etc. In at least one embodiment, user interface module 110 may be optional. For example, device 100 may be a server (e.g., in a server rack) that does not comprise a local user interface module 110, but instead relies upon a remote client to provide user interface functionality allowing an operator to interact with different rack servers.

Communication interface module 112 may be configured to manage packet routing and other control functions for communication module 114, which may include resources configured to support wired and/or wireless communications. In some instances, device 100 may comprise more than one communication module 114 (e.g., including separate physical interface modules for wired protocols and/or wireless radios) managed by a centralized communication interface module 112. Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 112 may be configured to prevent wireless communications that are active in communication module 114 from interfering with each other. In performing this function, communication interface module 112 may schedule activities for communication module 114 based on, for example, the relative priority of messages awaiting transmission. While the embodiment disclosed in FIG. 1 illustrates communication interface module 112 being separate from communication module 114, it may also be possible for the functionality of communication interface module 112 and communication module 114 to be incorporated within the same module.

Data storage device 116 may comprise fixed or removable memory including, but not limited to, magnetic memories such as, for example, floppy disks, hard disk drives (HDD), etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. In at least one embodiment, data storage device 116 may be an SSD, an example of which is shown at 118. SSD 118 may be integrated into device 100 (e.g., similar to an internal hard disk drive coupled via a connection based on various standards such as small computer system interface (SCSI), an integrated drive electronics (IDE), peripheral component interconnection (PCI) bus, PCI express, etc.) or may be situated separate from device 100 (e.g., coupled via external wired or wireless interface). SSD 118 may comprise at least drive controller 120, NV physical memory 122, host interface 126, and optionally cache memory 128. Drive controller 120 may control the overall operation of SSD 118 including, for example, handling external read/write requests to SSD 118 and other operations for maintaining drive performance (e.g., wear-leveling, speed optimization, etc.). For example, drive controller 120 may comprise at least flash translation layer (FTL) 154 configured to translate device logical block addresses (LBAs) into physical memory addresses (PMAs) in SSD 118. NV physical memory 122 may comprise various configurations of relatively low latency byte-accessible NV solid state memory utilizing technologies such as, but not limited to, single or multi-threshold level NAND flash memory, NOR flash memory, magnetoresistive memory (MRAM), single or multilevel phase change memory (PCM, PRAM), three-dimensional (3D) cross-point memory, resistive memory, nanowire memory, ferroelectric transistor memory (F-RAM, FeTRAM), spin-transfer torque memory (STT), thermal-assisted switching memory (TAS), millipede memory, floating junction gate memory (FJG RAM), battery-backed RAM, memristor-based memory, or a combination of any of the above. Host interface 126 may include wired and/or wired interfaces through which device 100 may interact with SSD 118. Cache 128 may comprise at least volatile memory that may temporarily store read/write data to increase drive access speed. Along with controlling the storage of data in SSD 118, drive controller 120 may further comprise equipment and/or software resources configured to support gradual context save methodology (GCSM) 130 which may further cause drive controller 120 to gradually store context data based on, for example, a budget ratio. The operation of GCSM 130 will be discussed further in FIG. 2.

Figure 2:
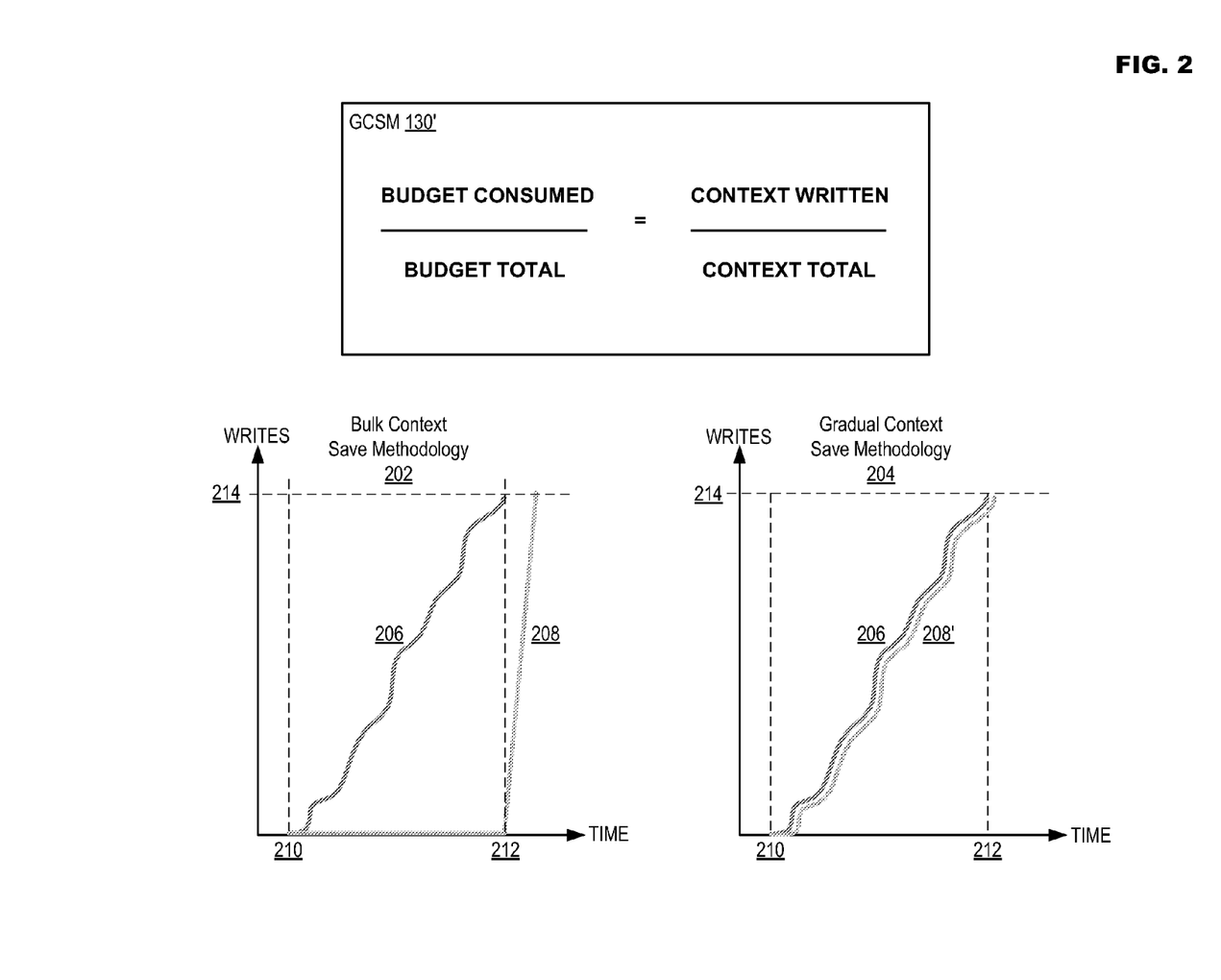
FIG. 2 illustrates examples of a gradual context saving methodology, bulk context saving behavior and gradual context saving behavior in accordance with at least one embodiment of the present disclosure.

FIG. 2 illustrates examples of GCSM 130', bulk context saving behavior 202 and gradual context saving behavior 204 in accordance with at least one embodiment of the present disclosure. SSD 116 may comprise, for example, a control module such as drive controller 120. Drive controller 120 may comprise hardware (e.g., local processing resources) and/or software (e.g., at least FTL 154 and GCSM 130') for controlling data write activity in SSD 118. Data write activity may include, for example, any activity that results in reading and/or writing data in SSD 118, and may include data manipulations that are not the results of requests received from outside of SSD 118 such as reading and/or writing data for speed optimization to improve data access speed, wear-balancing, etc. In an alternate embodiment, some control aspects associated with the control module (e.g., drive controller 120, and more specifically at least GCSM 130'), may be situated apart from SSD 118 and may be coupled to SSD 118 via, for example, a bus in device 100 or an external interface if SSD 118 is an external drive. For example, some or all of the functionality associated with at least GCSM 130' may be handled by processing module 104 (e.g., a processor in processing module 104 executing driver software for controlling SSD 118).

In at least one embodiment, the control module (e.g., including at least GCSM 130') may be responsible for maintaining the context of SSD 118. "Context," as referenced herein, may comprise data describing the current state of SSD 118. Context data may include, for example, logical to physical address mapping, optimization data, wear-leveling data, backup data, etc. Logical to physical address mapping may comprise mapping a logical address utilized by an OS in device 100 to access data stored in SSD 118 to a physical address specifying an actual location within the NV memory in SSD 118 where the data is stored. The OS may employ the logical address when accessing the data even though the physical location of the data in the NV memory within SSD 118 may change due to optimizations such as wear-leveling. In wear-leveling the physical location in the NV memory in SD 118 in which data is stored may vary so that physical memory locations that contain data that is frequently accessed do not wear out before the rest of the NV memory in SD 118. The storage of context data for SSD 118 is not necessary as the context may be reconstructed when needed. However, the reconstruction of context may result in a substantial delay until the SSD 118 is ready to receive/provide data (e.g., "time-to-ready"). The storage of context data may greatly reduce time-to-ready (e.g. after device 100 experiences an orderly or disorderly shutdown), and thus, may improve the performance of SSD 118.

Existing systems may store context data using a "bulk" methodology wherein data write activity for SSD 118 is monitored until a threshold is reached, and then context data corresponding to the state of SSD 118, in entirety, is saved. An example of this behavior has been disclosed at 202 in FIG. 2, wherein write activity 206 increases from time 210 to 212 until write activity 206 crosses a predetermined threshold 214. Context data activity 208 may remain at or near zero until time 212 when threshold 214 is crossed, wherein it may increase substantially to save the context data. SSD 118 has a finite capacity to support write activity, and thus, at time 212 write activity 206 may be negatively impacted by the need to support context data activity 208. The impact of this combined burden on SSD 118 may be realized especially in cases where write activity 206 may occur concurrently with context data activity 208. To maintain consistent performance, write activity 206 may be throttled by design to operate at a speed below the actual top speed of SSD 118 to absorb the additional write burden created at time 212. In this manner, the performance of SSD 118 may be even when saving context, albeit at an artificially slow speed.

Consistent with the present disclosure, GCSM 130' may cause the control module (e.g., drive controller 120) to control SSD 118 to save context data in NV memory 122 in SSD 118 gradually over time, and thus, to reduce the large percentage of NV memory bandwidth that is consumed sporadically for bulk saves of context data in SSD 118. This reduction in sporadic bandwidth consumption may result in more consistent performance for SSD 118. An example, budget ratio that may be employed to gradually save context data is represented by the equation:

$$\frac{\text{Budget Consumed}}{\text{Budget Total}} = \frac{\text{Context Written}}{\text{Context total}} \quad (1)$$

In the above budget ratio, the budget total may correspond to a function of the user data writes scaled to meet a time-to-ready requirement. The budget consumed may be the amount of write activity (e.g., including access requests received from outside of SSD 118 and operations that occur internally for wear-balancing, etc.) already performed to NV memory 122 in SSD 118 towards the total data budget. The context total may correspond to the total amount of context data to save (e.g., to summarize the current state of SSD 118, in entirety). The context written may be the amount of context data written so far. The budget total may be based on, for example, the capacity of SSD 118 (e.g., the number of bytes of NV memory 122 available for storing user data), the amount of data currently stored in NV memory 122 on SSD 118, a target time-to-ready for SSD 118, etc. For example, time-to-ready may be determined by the amount of context data stored when SSD 118 is reinitialized due to an orderly or disorderly shutdown. The amount of context data stored reduces the amount of context data that needs to be reconstructed from the contents of NV memory 122 in SSD 118 during initialization, and thus, decreases the time-to-ready. The budget ratio may be set to cause context data to be stored at a faster rate, which may result in a reduced time-to-ready for SSD 118.

An example to better comprehend how the budget ratio operates may be based on a flat indirection table (e.g., including logical to physical address mapping for SSD 118) that may utilize 4 bytes of context data to represent each 4 kilobytes of actual data saved in SSD 118. So, given that SSD 118 has a total capacity of 1 terabyte of NV memory 122 (e.g., the budget total), the context total may be 1 gigabyte. The context data may be written in chunks of data (e.g., 8 kilobyte or 16 kilobyte), wherein each data chunk is gradually written to the indirection table based on the write activity monitored for SSD 118 (e.g., as the budget consumed increases). When a threshold is reached (e.g., when the context written equals the context total, indicating that the saved context data for the current version of the context is complete), the budget ratio may be reset wherein, for example, the budget consumed and context written may be reset to 0 to initiate a new context save. While an example budget ratio is provided in FIG. 2, other relationships, equations, etc. may be utilized to cause context data to be gradually saved over time. Consistent with the present disclosure, the budget ratio may also consider other characteristics, parameters, etc. of SSD 118 such as, for example, write speed, workload, periods of inactivity (e.g., sleep periods), the physical/logical location of data within SSD 118, etc.

An example of behavior associated with a gradual context save methodology is shown at 204 in FIG. 2. Example 204 is similar to example 202 except in regard to context data activity 208'. Context data activity 208' demonstrates how write activity 206 may be monitored in view of the budget ratio, and as the budget consumed increases (e.g., as write activity 206 continues to increase due to various activities occurring in SSD 118) that context data activity 208' may increase accordingly. This manner of saving context data may distribute the additional burden imposed by the context data evenly throughout the operation of SSD 118, which may result in more consistent performance without a requirement of artificially throttling down the maximum allowed drive speed to provide adequate overhead for saving context data.

Figure 3:
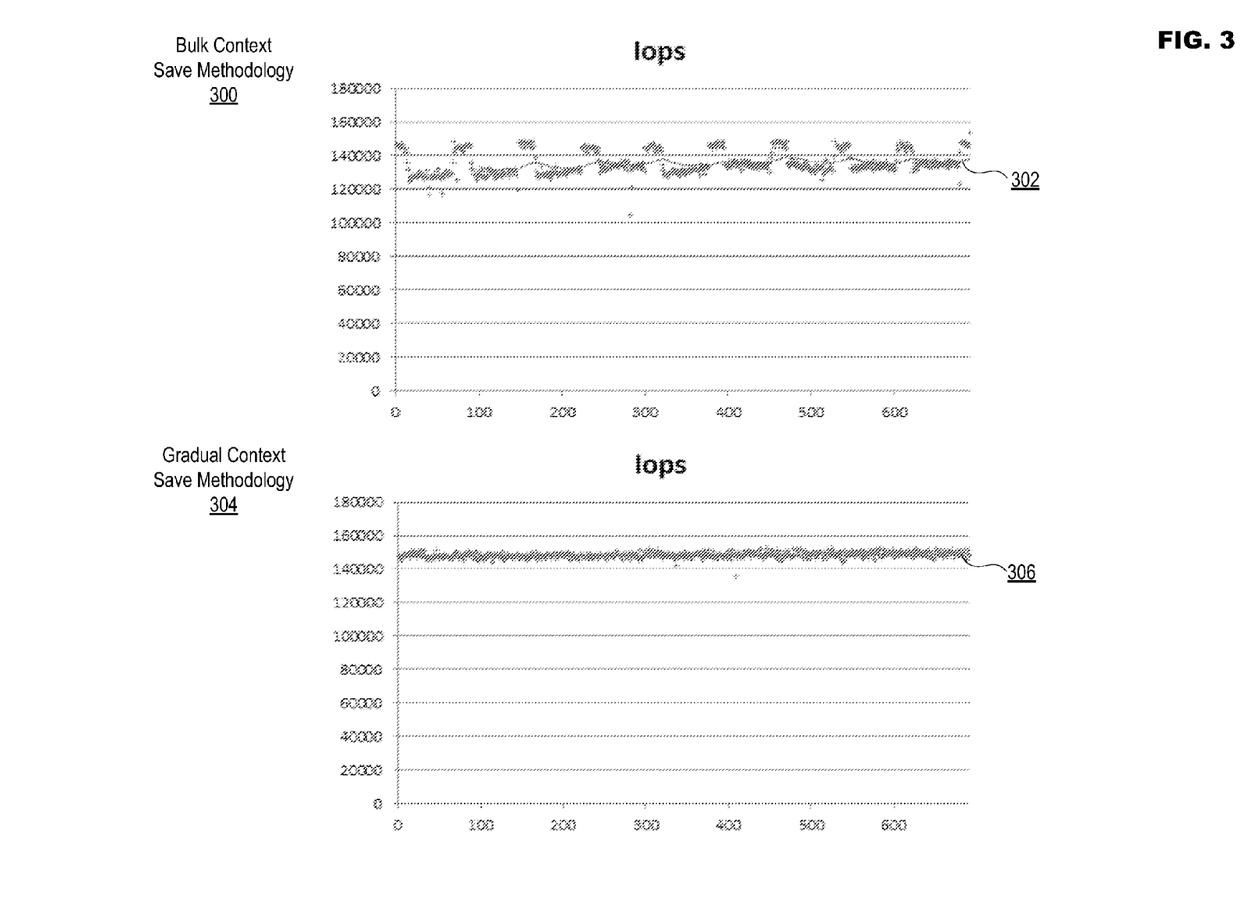
FIG. 3 illustrates example charts of the effects of bulk context saving and gradual context saving in accordance with at least one embodiment of the present disclosure.

FIG. 3 illustrates example charts of the effects of bulk context saving and gradual context saving in accordance with at least one embodiment of the present disclosure. Charts 300 and 302 demonstrate examples of the effects of bulk context data saving and gradual context data saving, respectively, on data storage device 116. Bulk context save methodology 300 plots input/output operations per second (Iops) vs. time. When only write activity 206 occurs, chart 300 illustrates brief periods of high performance (e.g., at approximately 150K Iops). These high performance periods are followed by periods of low performance (e.g., at approximately 130K Iops) wherein write activity 206 is burdened by the addition of context data activity 208. As a result, moving average line 302 demonstrates inconsistent performance comprising repeating highs and lows. These periods of slowness intermingled with periods of faster operation as shown in chart 300 may be frustrating to a user, and thus, may negatively impact the quality of the user experience. Lowering the normal operational speed of data storage device 116 may help to smooth out the performance, but would further reduce the overall read/write speed of data storage device 116.

On the contrary, chart 304 of the gradual context save methodology demonstrates how gradually writing context data over time (e.g., based on a budget ratio) may provide much more consistent performance. Instead of repeating peaks, moving average 306 appears substantially linear at 150K Iops. The gradual context save methodology not only provides more consistent performance, but performance is consistent at a speed of 150K Iops as shown at 306, which is higher than the moving average speed 302 seen in chart 300 (e.g., approximately 130K Iops). The combined consistent performance and faster operation may result in better user experience.

Figure 4:
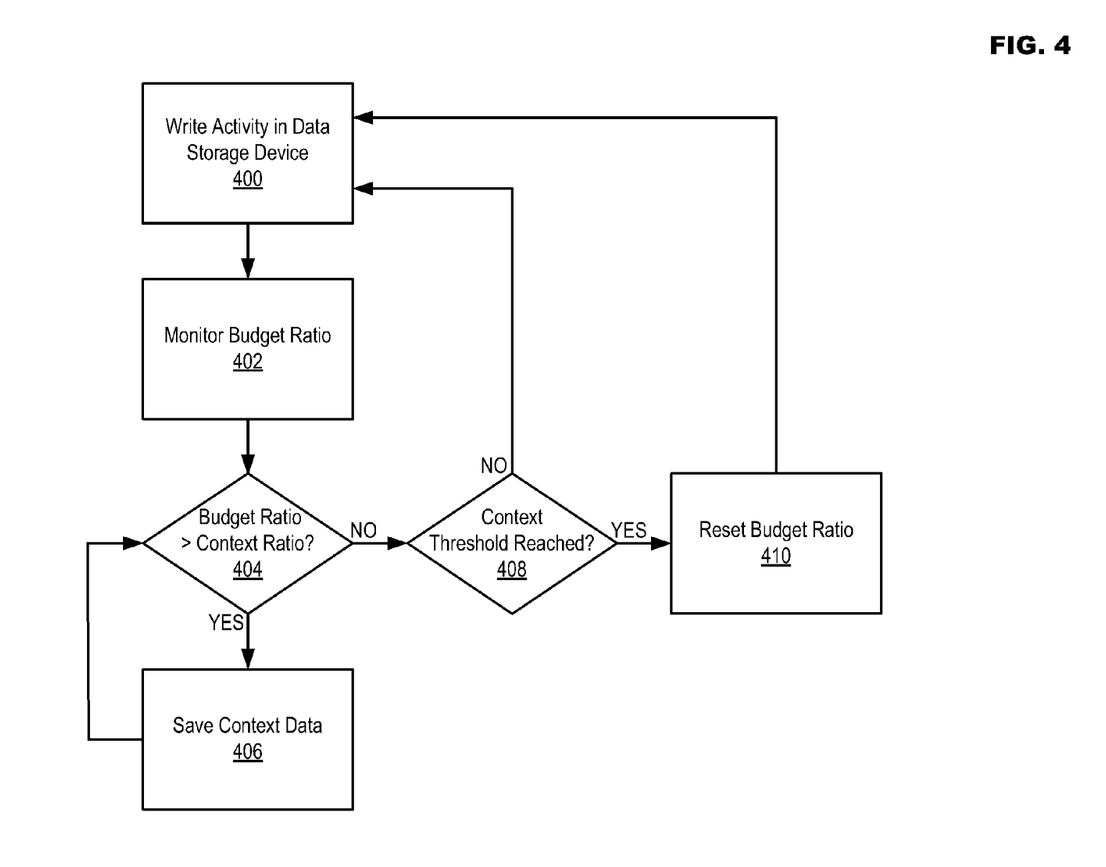
FIG. 4 illustrates example operations for gradual context saving for data storage devices in accordance with at least one embodiment of the present disclosure.

FIG. 4 illustrates example operations for gradual context saving for data storage devices in accordance with at least one embodiment of the present disclosure. In operation 400, write activity may occur in a data storage device. Write activity may comprise requests to recall or save data that are received from outside of the data storage device, or operations that originate within the data storage device such as for speed optimization, wear-balancing, etc. In operation 402 the budget ratio may be monitored. For example, the write activity occurring in operation 400 may occur in set increments (e.g., at least one block of data being read and/or saved in the data storage device) and following each increment a control module in the data storage device may then evaluate the ratio of the context written out of the context total (e.g., the context ratio) based on the budget consumed out of the budget total (e.g., the budget ratio). A determination may then be made on operation 404 as to whether the budget ratio is greater than the context ratio. A determination in operation 404 that the budget ratio is greater than the context ratio may result in context data being saved in operation 406. Context data may be saved in operation 406 until it is determined that the budget ratio is not greater than the context ratio in operation 404.

If in operation 404 it is determined that the budget ratio is not greater than the context ratio, then in operation 408 a determination may be made as to whether a context threshold has been reached. The context threshold may relate to the amount of context data saved, and may be based on the context written equaling the context total or the saved context corresponding to the state of the data storage device, in entirety. A determination in operation 408 that the context threshold has not yet been reached may be followed by a return to operation 400 wherein write activity may continue. Alternatively, a determination in operation 400 that the context threshold has been reached may be followed by operation 410 wherein the budget ratio may be reset. For example, resetting the budget ratio may include setting the budget consumed and context written values to zero to initiate the saving of an entirely new version of the context data. In at least one embodiment, resetting the budget ratio may further include recalculating the budget total and/or context total to account for changes in the data storage device (e.g., a change in storage capacity, a substantial change in the amount of data being stored, a change in a time-to-ready target, etc.). Operation 410 may then be followed by a return to operation 400 to continue write activity in the data storage device.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to gradual context saving in a data storage device. An example data storage device may comprise at least a non-volatile memory and a control module. The control module may cause context data to be gradually saved to the non-volatile memory based on monitoring write activity to the nonvolatile memory, wherein the context data may correspond to a current state of the data storage device. The control module may cause context data to be saved based on a budget ratio. For example, a budget ratio may compare an amount of total budget consumed (e.g., based a capacity of the data storage device, an amount of data stored in the data storage device, a target time-to-ready for the data storage device, etc.) to an amount of total context data that has already been written to the non-volatile memory.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for gradual context saving in a data storage device, as provided below.

According to example 1 there is provided a device configured for gradual context saving in a data storage device. The device may comprise a data storage device and a control module for the data storage device to at least monitor write activity to nonvolatile memory in the data storage device and to save context data to the nonvolatile memory gradually utilizing a ratio based on an amount of write activity monitored, the context data corresponding to a current state of the data storage device.

Example 2 may include the elements of example 1, wherein the control module is located in the data storage device.

Example 3 may include the elements of any of examples 1 to 2, wherein the control module is part of a processing module coupled to at least the data storage device via at least one bus in the device.

Example 4 may include the elements of any of examples 1 to 3, wherein the write activity occurs in increments and the control module is to determine whether to save the context data to the non-volatile memory utilizing the ratio after each increment of write activity.

Example 5 may include the elements of example 4, wherein the increments are blocks of data written to the non-volatile memory in the data storage device.

Example 6 may include the elements of any of examples 1 to 5, wherein the ratio is to compare an amount of total budget consumed to an amount of total context data that has already been written to the non-volatile memory.

Example 7 may include the elements of example 6, wherein the control module is to determine the total budget based on at least one of a capacity of the data storage device, an amount of data stored in the data storage device or a target time-to-ready for the data storage device.

Example 8 may include the elements of example 7, wherein the ratio is configured to cause the context data to be saved to the data storage device at a faster rate to reduce the time-to-ready.

Example 9 may include the elements of any of examples 1 to 8, wherein the control module is to determine if a context threshold has been reached and reset the ratio based on a determination that the context threshold has been reached.

Example 10 may include the elements of example 9, wherein in determining that the context threshold has been reached the control module is to determine that the saved context data corresponds to the current state of the data storage device in entirety.

Example 11 may include the elements of any of examples 1 to 10, wherein the data storage device is a solid state drive (SSD).

According to example 12 there is provided a data storage device. The data storage device may comprise a control module to at least monitor write activity to nonvolatile memory in the data storage device and to save context data to the nonvolatile memory gradually utilizing a ratio based on an amount of write activity monitored, the context data corresponding to a current state of the data storage device.

Example 13 may include the elements of example 12, wherein the write activity occurs in increments and the control module is to determine whether to save the context data to the non-volatile memory utilizing the ratio after each increment of write activity.

Example 14 may include the elements of example 13, wherein the increments are blocks of data written to the nonvolatile memory in the data storage device.

Example 15 may include the elements of any of examples 12 to 14, wherein the ratio is to compare an amount of total budget consumed to an amount of total context data that has already been written to the non-volatile memory.

Example 16 may include the elements of example 15, wherein the control module is to determine the total budget based on at least one of a capacity of the data storage device, an amount of data stored in the data storage device or a target time-to-ready for the data storage device.

Example 17 may include the elements of example 16, wherein the ratio is configured to cause the context data to be saved to the data storage device at a faster rate to reduce the time-to-ready.

Example 18 may include the elements of any of examples 12 to 17, wherein the control module is to determine if a context threshold has been reached and reset the ratio based on a determination that the context threshold has been reached.

Example 19 may include the elements of example 18, wherein in determining that the context threshold has been reached the control module is to determine that the saved context data corresponds to the current state of the data storage device in entirety.

Example 20 may include the elements of any of examples 12 to 19, wherein the data storage device is a solid state drive (SSD).

According to example 21 there is provided a method for gradual context saving in a data storage device. The method may comprise monitoring write activity to a nonvolatile memory in a data storage device and saving context data to the non-volatile memory gradually utilizing a ratio based on an amount of write activity monitored, the context data corresponding to a current state of the data storage device.

Example 22 may include the elements of example 21, and may further comprise determining whether to save the context data to the non-volatile memory utilizing the ratio after an increment of write activity.

Example 23 may include the elements of any of examples 21 to 22, wherein the ratio compares an amount of total budget consumed to an amount of total context data that has already been written to the non-volatile memory.

Example 24 may include the elements of example 23, wherein the total budget is determined based on at least one of a capacity of the data storage device, an amount of data stored in the data storage device or a target time-to-ready for the data storage device.

Example 25 may include the elements of example 24, and may further comprise configuring the ratio to cause the context data to be saved to the data storage device at a faster rate to reduce the time-to-ready.

Example 26 may include the elements of any of examples 21 to 25, and may further comprise determining if a context threshold has been reached and resetting the ratio based on a determination that the context threshold has been reached.

Example 27 may include the elements of example 26, wherein determining that the context threshold has been reached comprises determining that the stored context data corresponds to the current state of the data storage device in entirety.

Example 28 may include the elements of any of examples 21 to 27, wherein the data storage device is a solid state drive (SSD).

According to example 29 there is provided a system including at least a device, the system being arranged to perform the method of any of the above examples 21 to 28.

According to example 30 there is provided a chipset arranged to perform the method of any of the above examples 21 to 28.

According to example 31 there is provided at least one machine readable medium comprising a plurality of instructions that, in response to be being executed on a computing device, cause the computing device to carry out the method according to any of the above examples 21 to 28.

According to example 32 there is provided a device configured for gradual context saving in a data storage device, the device being arranged to perform the method of any of the above examples 21 to 28.

According to example 33 there is provided a system for gradual context saving in a data storage device. The system may comprise means for monitoring write activity to a nonvolatile memory in a data storage device and means for saving context data to the non-volatile memory gradually utilizing a ratio based on an amount of write activity monitored, the context data corresponding to a current state of the data storage device.

Example 34 may include the elements of example 33, and may further comprise means for determining whether to save the context data to the non-volatile memory utilizing the ratio after an increment of write activity.

Example 35 may include the elements of any of examples 33 to 34, wherein the ratio compares an amount of total budget consumed to an amount of total context data that has already been written to the non-volatile memory.

Example 36 may include the elements of example 35, wherein the total budget is determined based on at least one of a capacity of the data storage device, an amount of data stored in the data storage device or a target time-to-ready for the data storage device.

Example 37 may include the elements of example 36, and may further comprise means for configuring the ratio to cause the context data to be saved to the data storage device at a faster rate to reduce the time-to-ready.

Example 38 may include the elements of any of examples 33 to 37, and may further comprise means for determining if a context threshold has been reached and means for resetting the ratio based on a determination that the context threshold has been reached.

Example 39 may include the elements of example 38, wherein the means for determining that the context threshold has been reached comprise means for determining that the stored context data corresponds to the current state of the data storage device in entirety.

Example 40 may include the elements of any of examples 33 to 39, wherein the data storage device is a solid state drive (SSD).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device configured for gradual context saving, the device comprising:
   a data storage device; and
   a drive controller for the data storage device, the drive controller to at least monitor write activity to nonvolatile memory in the data storage device and to save context data to the nonvolatile memory gradually utilizing a ratio based on, at least in part, one or more of a budget consumed to a budget total or a context written to a context total, the context data corresponding to a current state of the data storage device.

2. The device of claim 1, wherein the drive controller is located in the data storage device.

3. The device of claim 1, wherein the drive controller comprises a processor coupled to at least the data storage device via at least one bus in the device.

4. The device of claim 1, wherein the write activity occurs in increments and the drive controller is to determine whether to save the context data to the non-volatile memory utilizing the ratio after each increment of write activity.

5. The device of claim 1, wherein the ratio is to compare the budget consumed to the context written to the non-volatile memory.

6. The device of claim 5, wherein the drive controller is to determine the budget total based on at least one of a capacity of the data storage device, an amount of data stored in the data storage device or a target time-to-ready for the data storage device.

7. The device of claim 1, wherein the drive controller to:
   determine if a context threshold has been reached; and
   reset the ratio based on a determination that the context threshold has been reached.

8. The device of claim 7, wherein in determining that the context threshold has been reached the drive controller is to determine that the saved context data corresponds to the current state of the data storage device in entirety.

9. The device of claim 1, wherein the data storage device is a solid state drive (SSD).

10. A controller, comprising:
    control circuitry to at least monitor write activity to nonvolatile memory in a data storage device and to save context data to the nonvolatile memory gradually utilizing a ratio based on, at least in part, one or more of a budget consumed to a budget total or a context written to a context total, the context data corresponding to a current state of the data storage device.

11. A method for gradual context saving in a data storage device, comprising:
    monitoring write activity to a nonvolatile memory in the data storage device; and
    saving context data to the non-volatile memory gradually utilizing a ratio based on, at least in part, one or more of a budget consumed to a budget total or a context written to a context total, the context data corresponding to a current state of the data storage device.

12. The method of claim 11, further comprising:
    determining whether to save the context data to the non-volatile memory utilizing the ratio after an increment of write activity.

13. The method of claim 11, wherein the ratio compares the budget consumed to the context written to the non-volatile memory.

14. The method of claim 13, wherein the budget total is determined based on at least one of a capacity of the data storage device, an amount of data stored in the data storage device or a target time-to-ready for the data storage device.

15. The method of claim 11, further comprising:
determining if a context threshold has been reached; and
resetting the ratio based on a determination that the context threshold has been reached.

16. The method of claim 15, wherein determining that the context threshold has been reached comprises determining that the stored context data corresponds to the current state of the data storage device in entirety.

17. At least one machine-readable storage medium having stored thereon, individually or in combination, instructions for gradual context saving in a data storage device that, when executed by one or more processors, cause the one or more processors to:
monitor write activity to a nonvolatile memory in the data storage device; and
save context data to the non-volatile memory gradually utilizing a ratio based on, at least in part, one or more of a budget consumed to a budget total or a context written to a context total, the context data corresponding to a current state of the data storage device.

18. The method of claim 17, further comprising instructions that, when executed by one or more processors, cause the one or more processors to:
determine whether to save the context data to the non-volatile memory utilizing the ratio after an increment of write activity.

19. The medium of claim 17, wherein the ratio compares the budget consumed to the context written to the non-volatile memory.

20. The medium of claim 19, wherein the budget total is determined based on at least one of a capacity of the data storage device, an amount of data stored in the data storage device or a target time-to-ready for the data storage device.

21. The medium of claim 17, further comprising instructions that, when executed by one or more processors, cause the one or more processors to:
determine if a context threshold has been reached; and
reset the ratio based on a determination that the context threshold has been reached.

22. The medium of claim 21, wherein the instructions for determining that the context threshold has been reached comprise instructions that, when executed by one or more processors, cause the one or more processors to:
determine that the stored context data corresponds to the current state of the data storage device in entirety.

* * * * *